(12) United States Patent
Williamson

(10) Patent No.: US 9,888,629 B2
(45) Date of Patent: Feb. 13, 2018

(54) HARVESTER

(71) Applicant: A & B Packing Equipment, Inc., Lawrence, MI (US)

(72) Inventor: Robert L Williamson, Hartford, MI (US)

(73) Assignee: A&B Packing Equipment, Inc., Lawrence, MI (US)

( * ) Notice: Subject to any disclaimer, the term of this patent is extended or adjusted under 35 U.S.C. 154(b) by 92 days.

(21) Appl. No.: 15/042,428

(22) Filed: Feb. 12, 2016

(65) Prior Publication Data

US 2017/0231158 A1 Aug. 17, 2017

(51) Int. Cl.
*A01D 46/26* (2006.01)

(52) U.S. Cl.
CPC .................................. *A01D 46/264* (2013.01)

(58) Field of Classification Search
CPC .............................. A01D 46/264; A01D 46/26
USPC ........................................................... 56/330
See application file for complete search history.

(56) References Cited

U.S. PATENT DOCUMENTS

| 3,449,895 | A | * | 6/1969 | Pertics | A01D 46/28 |
| | | | | | 56/330 |
| 4,282,706 | A | * | 8/1981 | Orlando | A01D 46/28 |
| | | | | | 56/328.1 |
| 4,860,529 | A | * | 8/1989 | Peterson | A01D 46/28 |
| | | | | | 56/328.1 |
| 4,959,950 | A | * | 10/1990 | Burke | A01D 46/28 |
| | | | | | 56/330 |
| 4,974,404 | A | * | 12/1990 | Korthuis | A01D 46/28 |
| | | | | | 56/328.1 |
| 5,495,708 | A | * | 3/1996 | Scott | A01D 46/28 |
| | | | | | 56/329 |
| 5,660,033 | A | * | 8/1997 | Korthuis | A01D 46/28 |
| | | | | | 56/330 |
| 6,378,282 | B1 | * | 4/2002 | Carlton | A01D 46/264 |
| | | | | | 56/328.1 |
| 6,484,487 | B1 | * | 11/2002 | Buist | A01D 46/264 |
| | | | | | 56/330 |
| 6,865,872 | B2 | * | 3/2005 | Youman | A01D 46/28 |
| | | | | | 56/328.1 |
| 8,635,845 | B1 | * | 1/2014 | Palm | A01D 46/28 |
| | | | | | 56/328.1 |
| 2010/0024374 | A1 | * | 2/2010 | Pellenc | A01D 46/28 |
| | | | | | 56/330 |

FOREIGN PATENT DOCUMENTS

WO WO 2005043978 A1 * 5/2005 ........... A01D 46/264

* cited by examiner

*Primary Examiner* — John Weiss

(57) ABSTRACT

A harvester having a frame, an agitating system and a product gathering system. The frame has a central portion configured to receive and pass plants therethrough. The agitating system is positioned within the central portion that has a first side agitating assembly further comprising an axle with an axis of rotation and a plural of axial wands extending axially outwardly therefrom in a spaced apart configuration. The axle has a first end which is both above and outboard of the second end and the axle is angled relative to a vertical plane bisecting the frame body from front to back thereof. The axial wands can be agitated. The product gathering system includes an outer guide wall positioned below the rotary agitator assembly. The outer guide wall is angled relative to a vertical plane bisecting the frame body from front to back thereof.

14 Claims, 10 Drawing Sheets

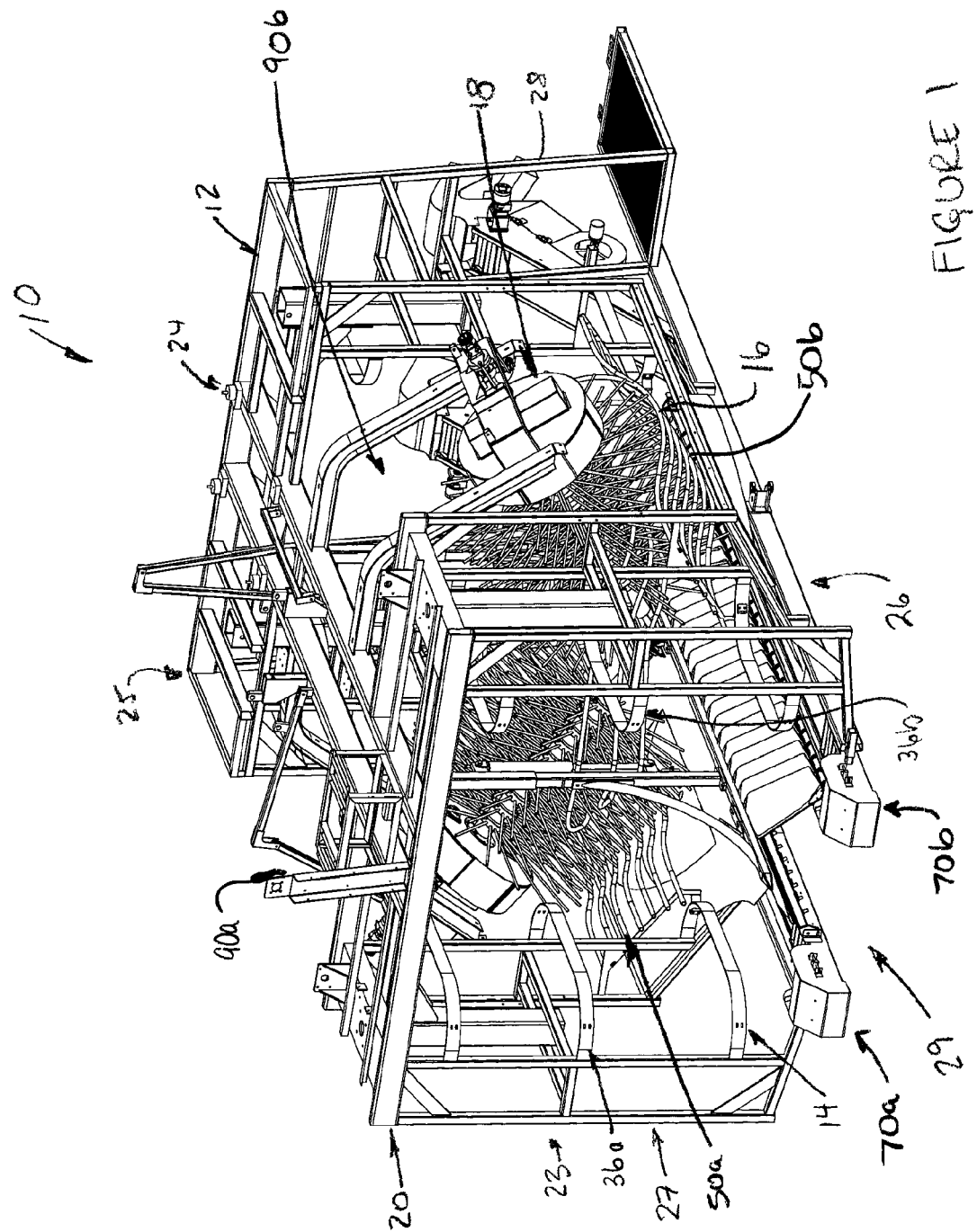

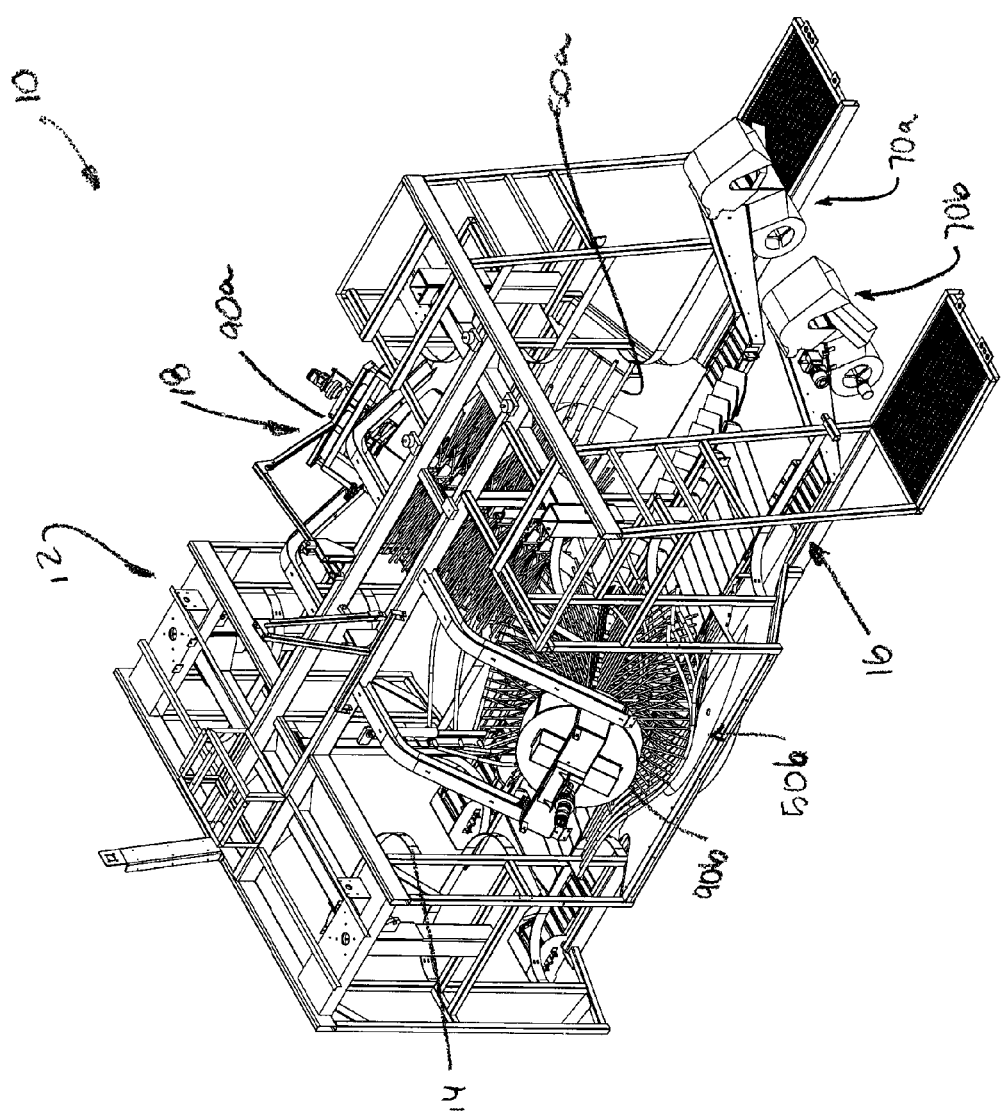

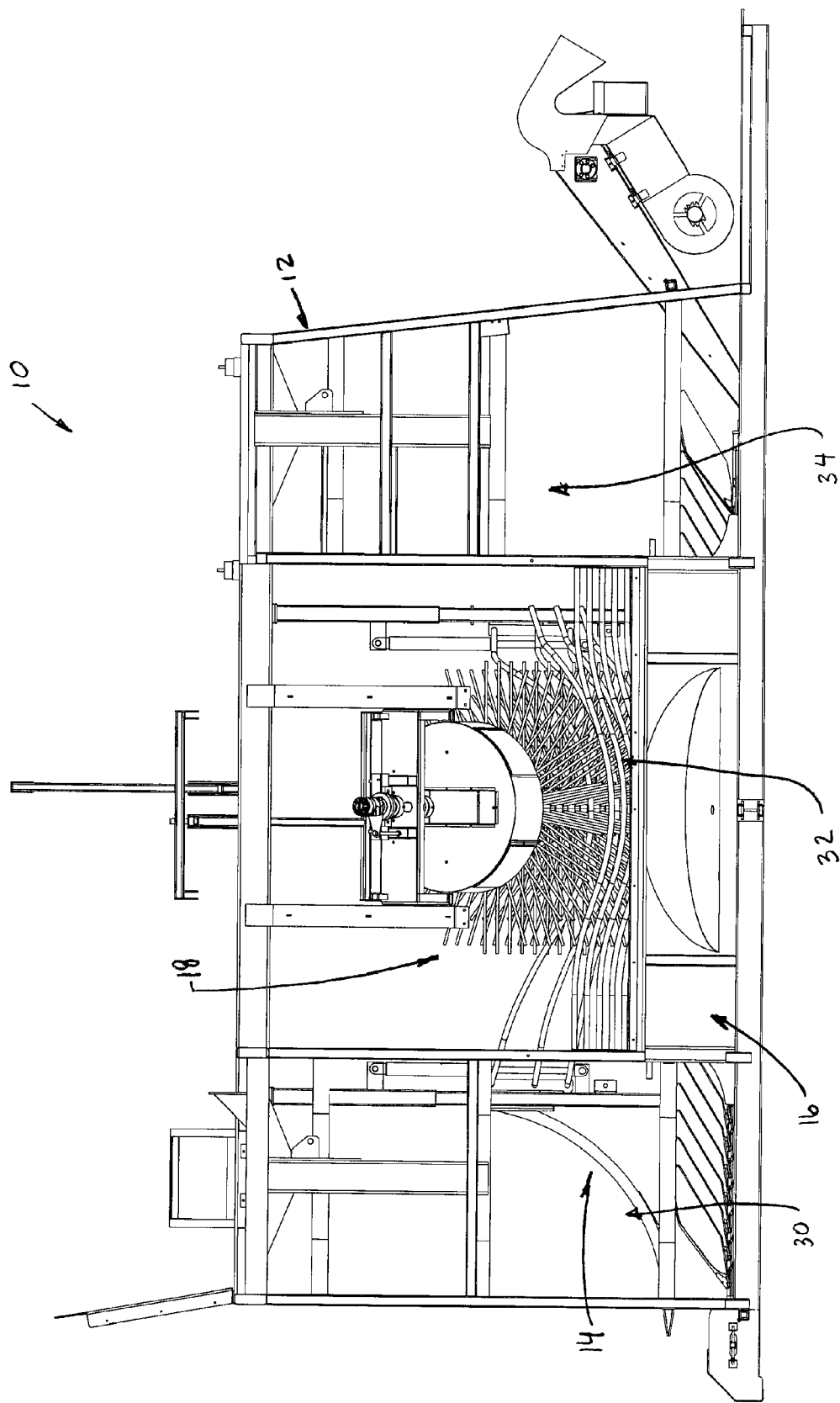

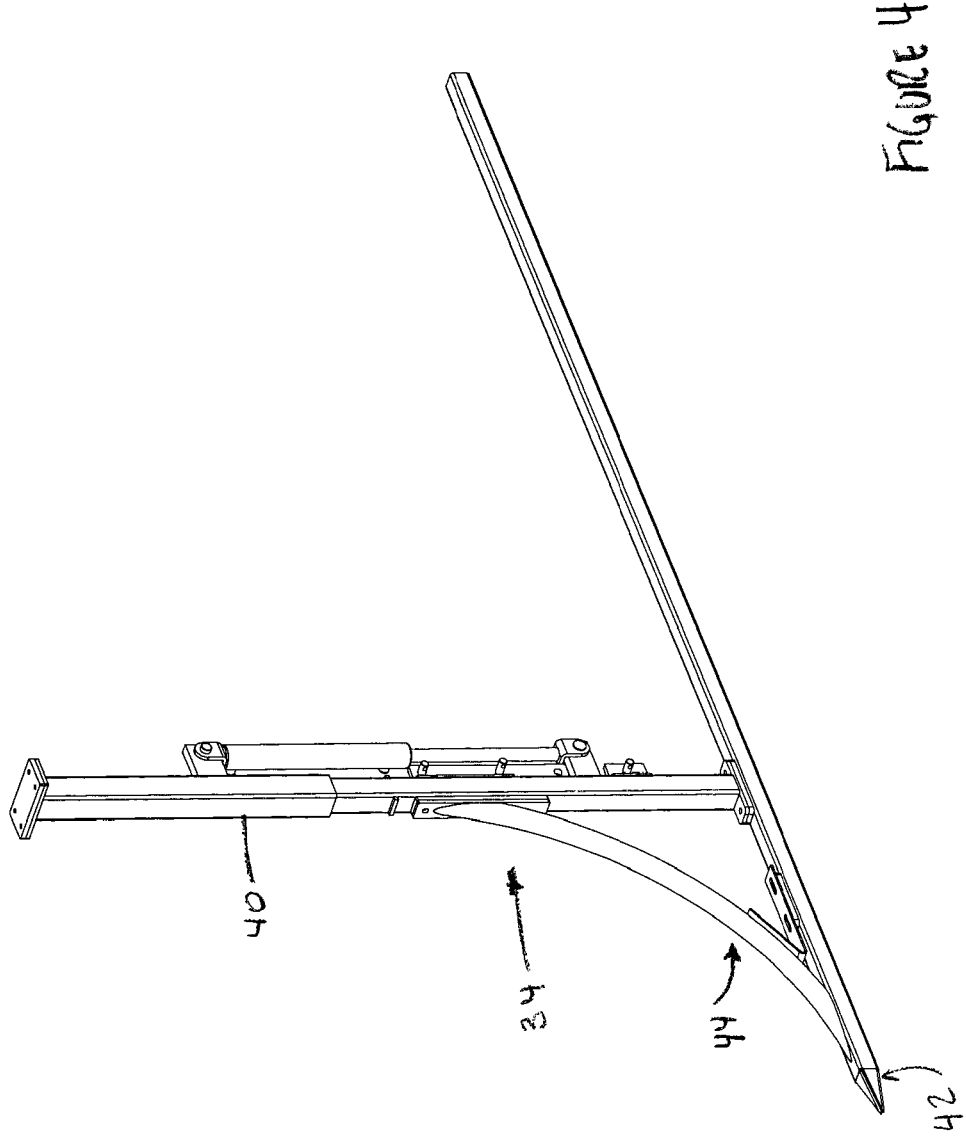

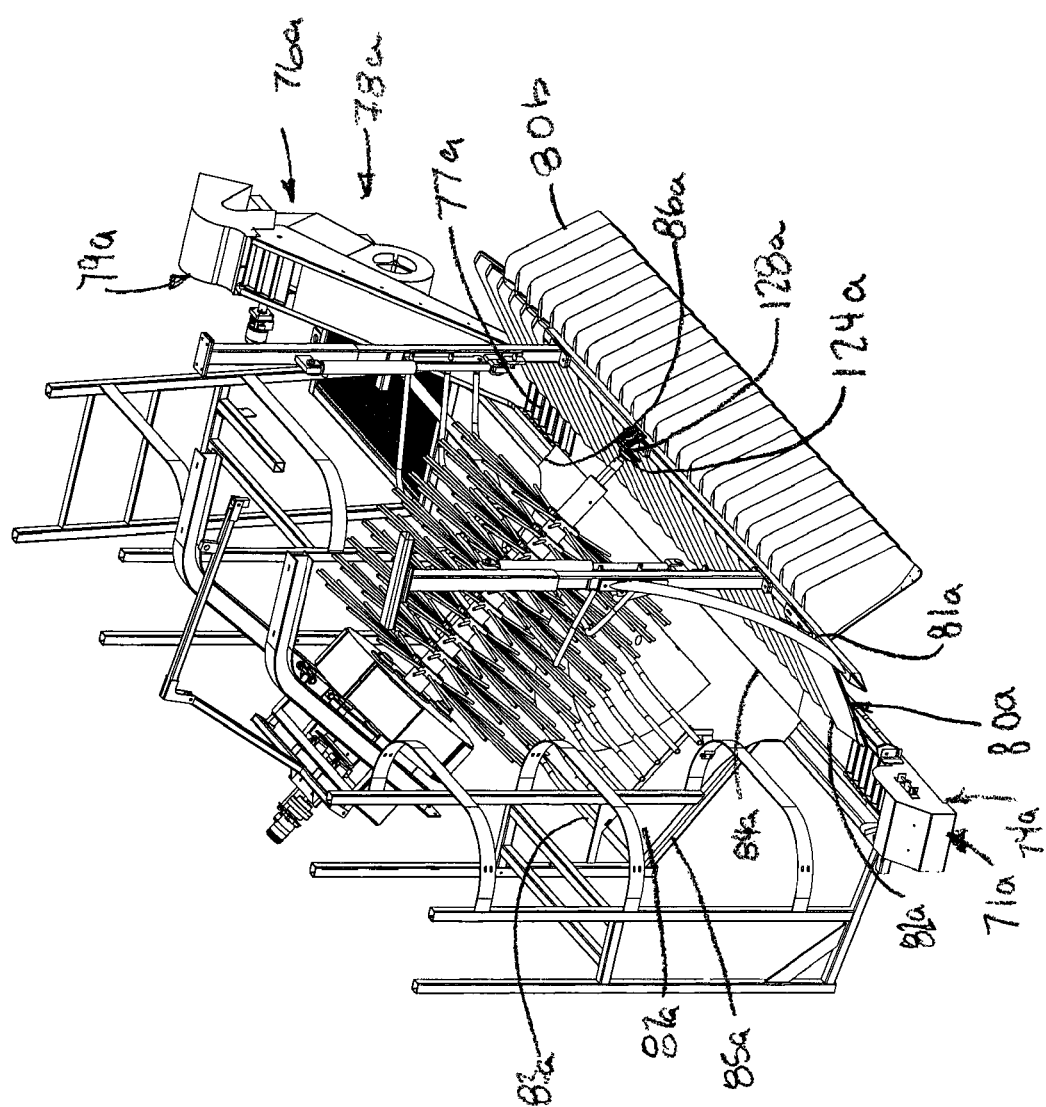

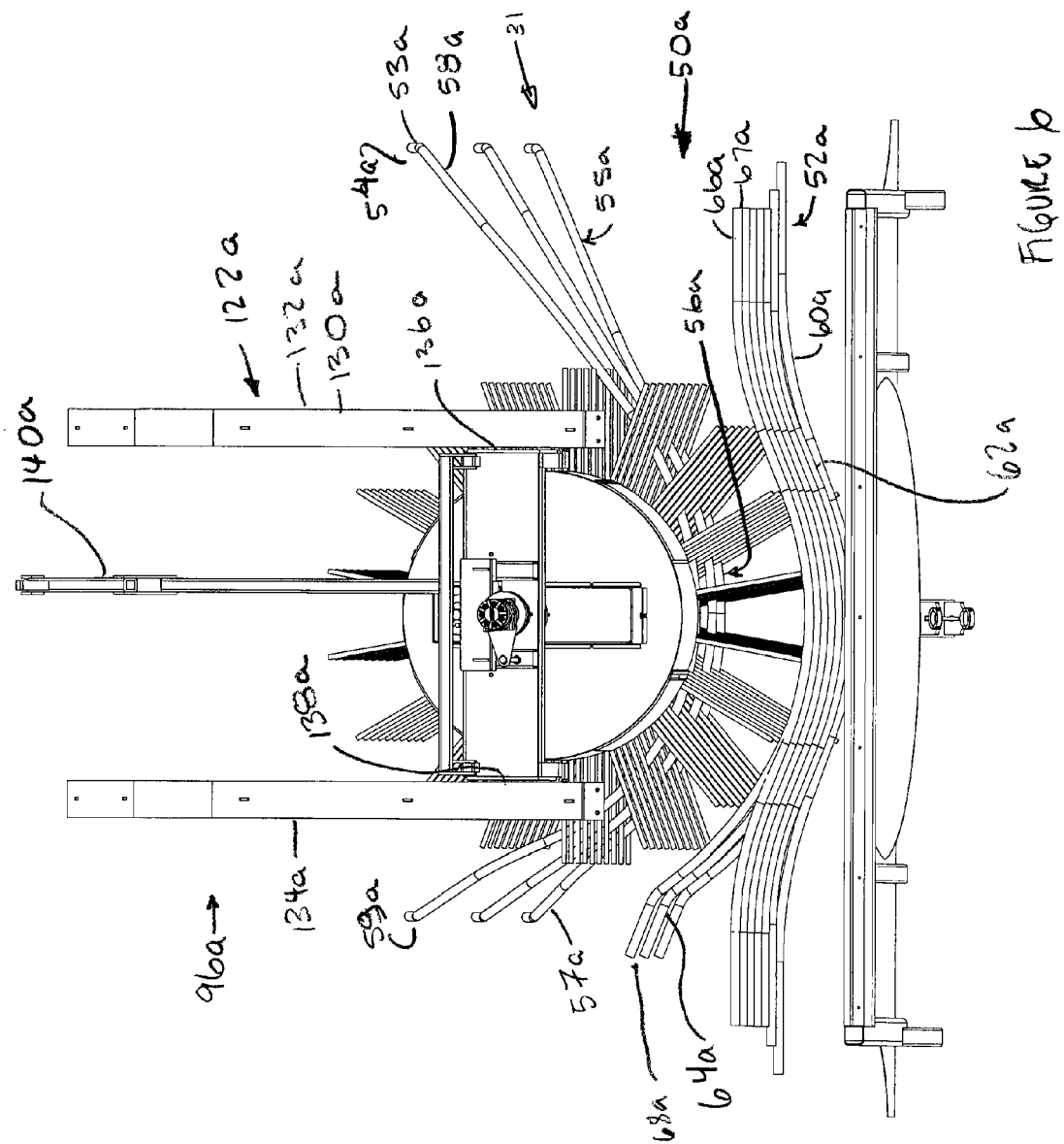

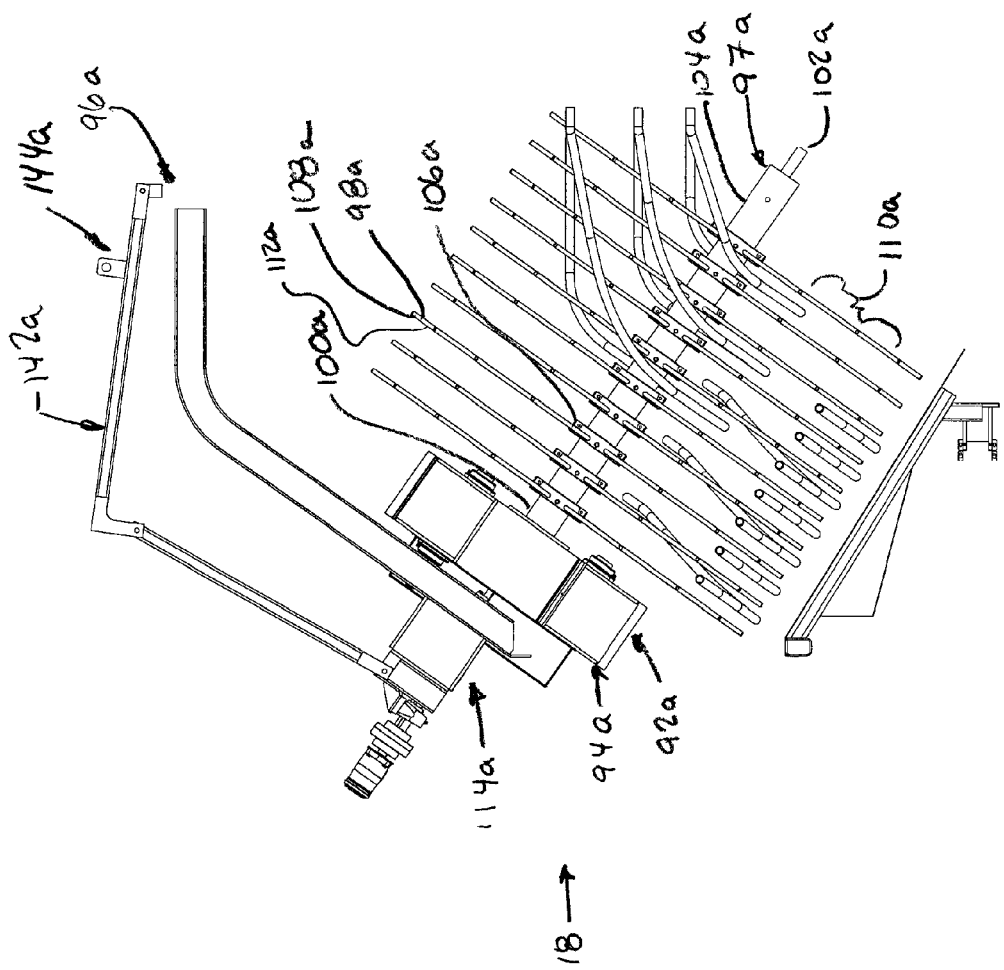

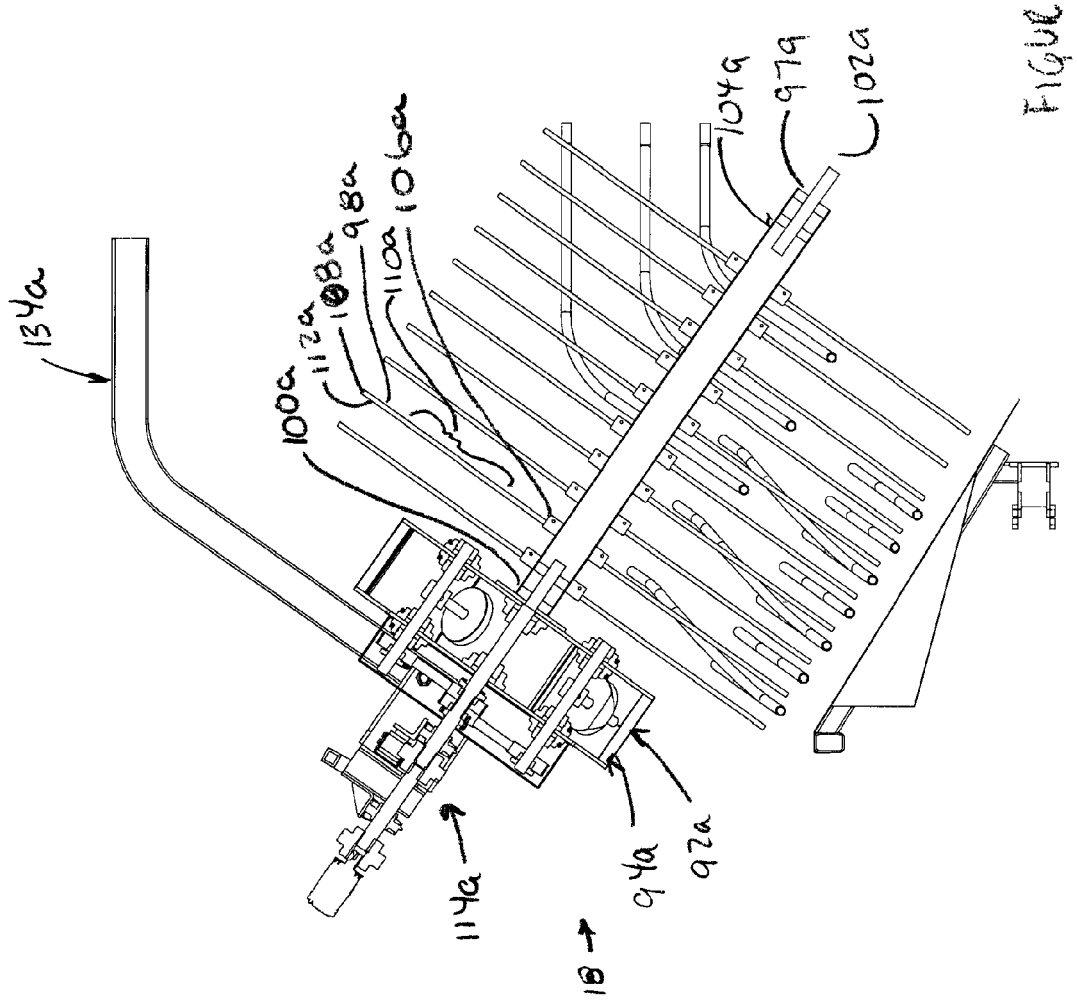

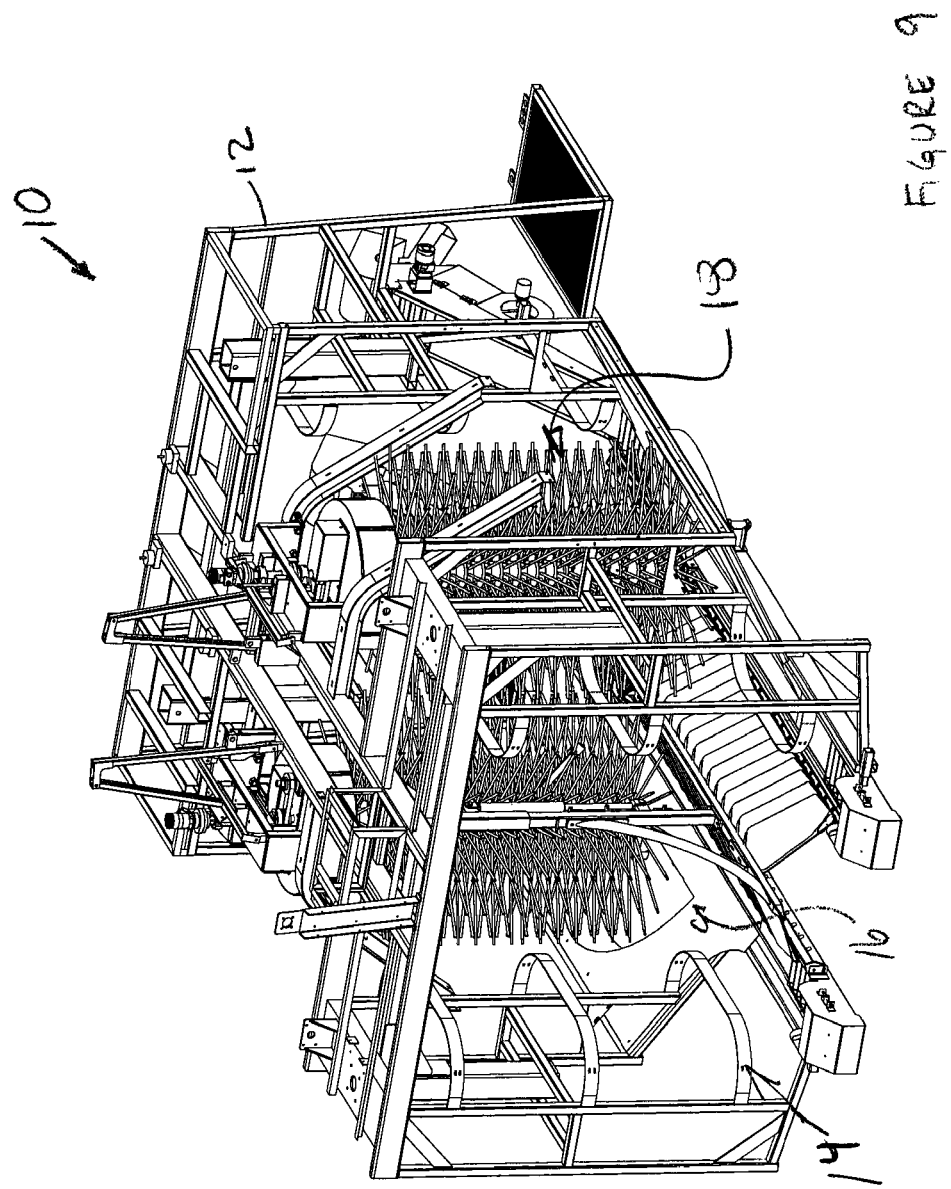

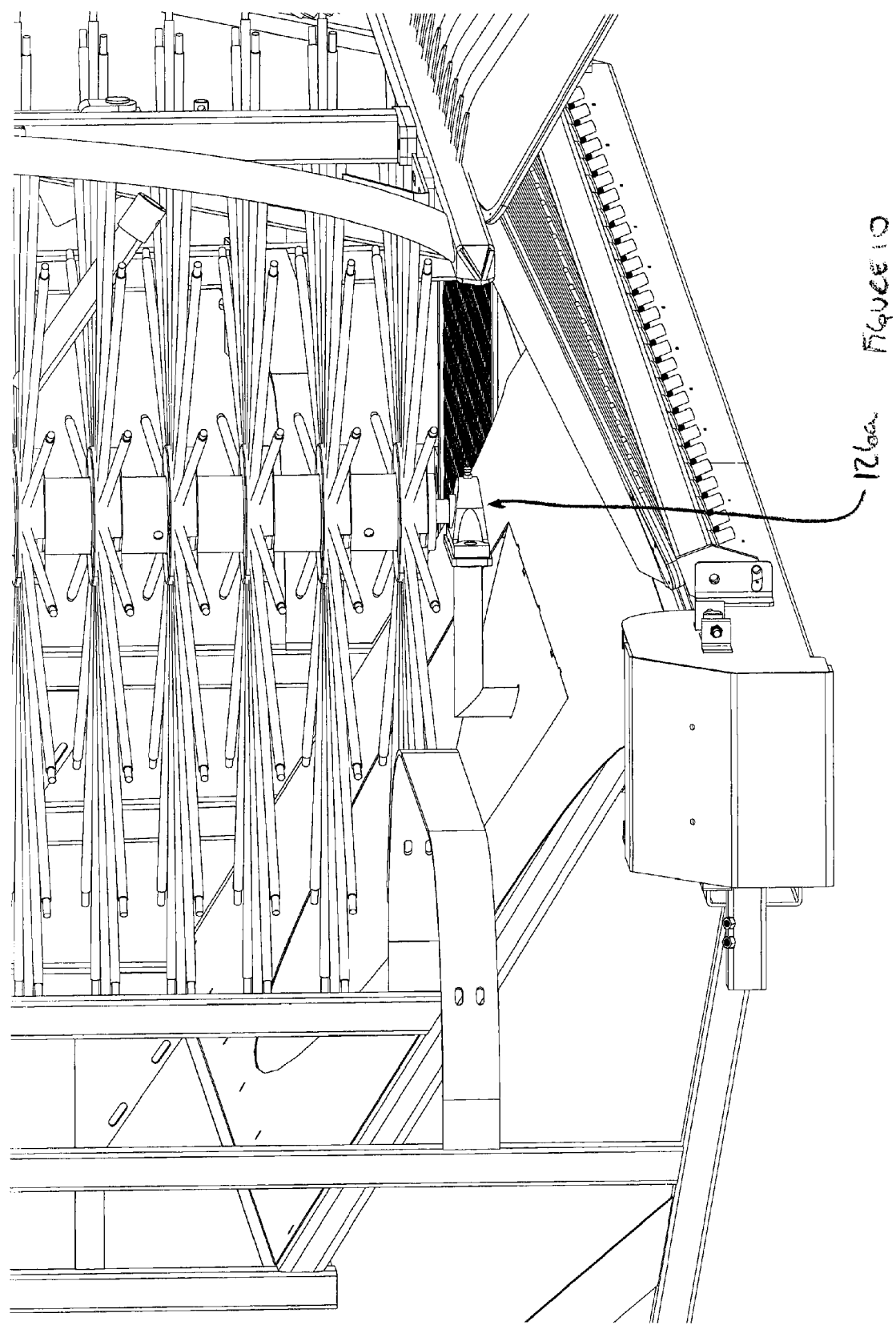

HARVESTER

CROSS-REFERENCE TO RELATED APPLICATION

N/A

BACKGROUND OF THE DISCLOSURE

1. Field of the Disclosure

The disclosure relates in general to a harvester, and more particularly, to a harvester that is particularly useful for the picking of blueberries and the like. The harvester is not limited to use in association with the picking of blueberries, or any fruit in particular, and the use in association with the picking of blueberries should be deemed exemplary and not limiting the use thereto.

2. Background Art

The harvesting of blueberries is well known in the art. Typically, mechanized equipment in the form of a blueberry harvester proceeds from blueberry plant to blueberry plant dislodging the blueberries onto conveyors which can then collect the blueberries and discharge them into baskets, boxes or the like. Mechanization has greatly increased the speed at which blueberries can be harvested and has also greatly reduced the labor required.

While advances have been made, there have been problems with such equipment. For example, such equipment may be well suited for picking blueberries that will be sold as frozen product. However, such equipment is typically not well suited for picking blueberries for packaging as fresh in retail packaging. Generally, the currently available mechanized equipment tends to damage a large portion of the blueberries during picking, and such damaged blueberries are typically not sellable as fresh in retail packaging. Thus, even where mechanization is utilized, hand picking continues to be the manner in which blueberries are harvested for packaging as fresh in retail packaging, as current picking equipment cannot achieve consistent product that is free of excessive damage, such as bruises, cuts, scuffs, and breaks, among other deformities.

It would be desirable to have a harvester that can pick product (such as fruit, including but not limited to blueberries) while minimizing damage to the product that is picked.

SUMMARY OF THE DISCLOSURE

The disclosure is directed to a harvester that is configured for the picking of product (such as fruit or nuts, for example) from a plant. In one configuration the harvester is particularly well suited for the picking of blueberries from blueberry plants. However, it will be understood that it is not limited thereto.

More particularly, the harvester, in this configuration includes a frame, an agitating system, and a product gathering system. The frame has a frame body defining a front, back, top, bottom, a first side and a second side. These cooperate to define an elongated and downwardly open central opening that is configured to allow for the passage of a plant from the front to the back therethrough. The agitating system is mounted to the frame. At least a portion of the agitating system is within the central channel of the frame. The agitating system has at least a first side agitating assembly.

The first side agitating assembly includes a rotary agitator subassembly. The rotary agitator subassembly has an axle with an axis of rotation and a plurality of axial wands extending axially outwardly therefrom in a spaced apart configuration, with the rotary agitator assembly being positioned in at least a first operating position. The axle has a first end and a second end. The first end is both above and outboard of the second end, so that the axle is angled relative to a vertical plane bisecting the frame body from front to back thereof. The axle is rotatable about the axis. The powering subassembly includes an agitation member which is configured to agitate the axial wands.

The product gathering system includes an outer guide wall positioned below the rotary agitator assembly. The outer guide wall has an upper end and a lower end. The upper end is above and outboard of the lower end, so that the outer guide wall is angled relative to a vertical plane bisecting the frame body from front to back thereof.

In some configurations, the harvester further has a plant directing system that includes a gathering portion. The gathering portion includes an inner guide frame outboard of the axle and spaced apart therefrom. At least a plurality of the axial wands extend therethrough. The inner guide frame directs a plant away from the axle and through at least a plurality of the axial wands.

In some configurations, the inner guide frame further includes an initial portion, a maintaining portion and an exit portion. The initial portion directs a portion of a plant outwardly and downwardly. The maintaining portion directs the plant through at least a plurality of the axial wands. The exit portion directs the plant inwardly and upwardly.

In some configurations, the inner guide frame comprises a plurality of spaced apart rod members extending at least partially between the front and back of the frame body. At least a plurality of the axial wands extend between or otherwise around and beyond the rod members.

In some configurations, the rod members of the inner guide frame are spaced apart from each other and spaced apart from the plurality of axial wands.

In some configurations, the gathering portion further comprises an outer frame guide outboard of the inner frame guide and spaced apart therefrom so as to direct at least a portion of the plant therebetween. At least a plurality of the axial wands extend at least one of proximate and beyond the outer guide frame.

In some configurations, the outer frame guide further includes a plurality of spaced apart rod members extending at least partially between the front and back of the frame body.

In some configurations, the rod members are spaced apart from each other and spaced apart from the plurality of axial wands.

In some configurations, the first side agitating assembly is further positionable in a second operating position. In the second operating position, the axle of the rotary agitator assembly is at an angle that is shallower than that of the first operating position. In some such configurations, the second operating position, the axle of the rotary agitator assembly is substantially vertical.

In some configurations, the first side agitating assembly further includes an orienting subassembly structurally configured to facilitate orientation of the rotary agitator subassembly between the first operating position and the second operating position.

In some such configurations, the orienting subassembly further includes an upper mount assembly including opposing guide channels with corresponding channel engaging pin members disposed proximate a first end of the rotary agitator subassembly. The opposing guide channels extend between the first operating position and the second operating position, and are configured to direct the first end of the rotary agitator subassembly between the first operating position and the second operating position.

In some configurations, the orienting subassembly further includes a lower mount assembly including a first position lower mount frame and a second position lower mount frame. A second end of the rotary agitator subassembly is attachable to the first position lower mount frame when in the first operating position, and attachable to the second position lower mount frame when in the second operating position.

In another aspect of the disclosure, the disclosure is directed to a harvester that includes multiple agitating assemblies. In particular, the harvester in another aspect of the disclosure includes a frame, an agitating assembly and a product gathering assembly. The frame has a frame body defining a front, back, top, bottom, a first side and a second side. These cooperate to define an elongated and downwardly open central opening which is configured to allow for the passage of a plant from the front to the back therethrough.

The agitating system is mounted to the frame, with at least a portion thereof being within the central channel of the frame. The agitating system has a first side agitating assembly and a second side agitating assembly, positioned in a spaced apart side by side configuration. Each of the first side agitating assembly and the second side agitating assembly further includes a rotary agitator subassembly. The rotary agitator subassembly has an axle with an axis of rotation and a plurality of axial wands extending axially outwardly therefrom in a spaced apart configuration, with the rotary agitator assembly being positioned in at least a first operating position. The axle has a first end and a second end. The first end is both above and outboard of the second end, so that the axle is angled relative to a vertical plane bisecting the frame body from front to back thereof. The axle is rotatable about the axis. The powering subassembly includes an agitation member which is configured to agitate the axial wands.

The rotary agitator subassembly has an axle with an axis of rotation and a plurality of axial wands extending axially outwardly therefrom in a spaced apart configuration. The rotary agitator assembly is positioned in at least a first operating position. In such a configuration the axle has a first end and a second end, with the first end being both above and outboard of the second end, so that the axle is angled relative to a vertical plane bisecting the frame body from front to back thereof. The axle is rotatable about the axis. The powering subassembly includes an agitation member which is configured to agitate the axial wands.

The product gathering system includes a first side outer guide wall and a second side outer guide wall. The first side outer guide wall is positioned below the rotary agitator assembly of the first side agitating assembly. The first side outer guide wall has an upper end and a lower end, with the upper end being above and outboard of the lower end, so that the first side outer guide wall is angled relative to a vertical plane bisecting the frame body from front to back thereof. The second side guide wall is positioned below the rotary agitator assembly of the second side agitating assembly. The second side outer guide wall has an upper end and a lower end, with the upper end being above and outboard of the lower end, so that the second side outer guide wall is angled relative to a vertical plane bisecting the frame body from front to back thereof.

In some configurations, the harvester further includes a plant directing system that includes an inlet portion positioned within the central opening and proximate the front of the frame body. The inlet portion includes a central separator portion spaced apart from the bottom of the frame body and configured to separate a plant into a first side and a second side.

In some configurations, the central separator portion extends between the first side agitating assembly and the second side agitating assembly. The central separator portion includes an arcuate portion that is outwardly convex so as to direct a plant in an outward and upward direction.

In some configurations, the plant directing system further comprises a gathering portion including a first side inner guide frame and a second side inner guide frame. In such a configuration, the first side inner guide frame further includes a first end extending from the central separator portion and directed outwardly so as to extend outboard of the axle of the rotary agitator subassembly of the first side agitating assembly while having a portion of at least a plurality of axial wands extending therebeyond. Similarly, the second side inner guide frame further includes a first end extending from the central separator portion and directed outwardly so as to extend outboard of the axle of the rotary agitator subassembly of the second side agitating assembly while having a portion of at least a plurality of axial wands extending therebeyond.

In some configurations, the gathering portion further includes a first side outer guide frame and a second side outer guide frame. In such a configuration, the first side outer guide frame is positioned outboard of the first side inner guide frame so as to define a region therebetween, with the axial wands of the first side agitating assembly extending thereinto. Similarly, the second side outer guide frame is positioned outboard of the second side inner guide frame so as to define a region therebetween, with the axial wands of the second side agitating assembly extending thereinto.

In some configurations, the harvester is substantially symmetrical about the vertical plane bisecting the frame body from front to back, which vertical plane extends through the central separator portion.

In some such configuration, the product gathering system further includes at least one conveyor extending between the front and the back of the frame and positioned so that the lower end of at least one of the first side outer guide wall and the second side outer guide wall directs a product therefrom onto the conveyor.

BRIEF DESCRIPTION OF THE DRAWINGS

The disclosure will now be described with reference to the drawings wherein:

FIG. 1 of the drawings is a front perspective view of the harvester of the present disclosure (without showing the wheels or motoring assemblies to propel and direct the harvester along the ground), showing the first side and second side agitating assembly in the first operating position;

FIG. 2 of the drawings is a back perspective view of the harvester of the present disclosure that is shown in FIG. 1;

FIG. 3 of the drawings is a side elevational view of the harvester of the present disclosure;

FIG. 4 of the drawings is a perspective view of the central separator portion of the inlet portion of the plant directing system;

FIG. 5 of the drawings is a partial perspective view of one side of the plant directing system, the product gathering system and the agitating system of the harvester of the present disclosure;

FIG. 6 of the drawings is a partial angled view that is substantially perpendicular to the axle of the first side agitating assembly, showing, in particular, the interaction between the first side agitating assembly, the first side gathering portion and the outer guide wall of the first side gathering portion;

FIG. 7 of the drawings is a front elevated view of the first side agitating assembly, the first side gathering portion and the outer guide wall of the first side gathering portion;

FIG. 8 of the drawings is a cross-sectional view of the view shown in FIG. 7, showing, the interaction between the first side agitating assembly, the first side gathering portion and the outer guide wall of the first side gathering portion;

FIG. 9 of the drawings is a perspective view of the harvester with the agitating system shown in the second operating position; and FIG. 10 of the drawings is a partial perspective view of the harvester of the present disclosure, showing, in particular, the first position frame of the first lower mount assembly of the orienting subassembly of the rotary agitator subassembly of the first side agitating assembly.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1 and 9, the harvester is shown generally at 10. The harvester is configurable into at least two different operating positions. A first operating position is shown in FIG. 1 and comprises a position wherein the picking structure is angled relative to the vertical (i.e., the rotary agitator subassembly). In such an orientation, the first and second side rotary agitator assemblies 92a, 92b are in an angled orientation. In such a configuration, the blueberry plant is split into two and directed to the outside of the agitator assemblies before being brought back together. A second operating position is shown in FIG. 9, wherein the rotary agitator assemblies are in a substantially vertical orientation. In such an orientation, in more detail, the first and second side rotary agitator assemblies 92a, 92b are in a substantially vertical orientation, with the intent to have the blueberry plant proceed between the rotary agitator subassemblies. It will be understood that in the preferred configuration, both the first and second operating positions are configurable on a single harvester, with the understanding that intermediate positions are likewise possible. In other configurations, the harvester may be configured in only one of the first operating position and the second operating position. It will be understood that in some such configurations, the components may be fixed, for example in the first operating position.

In more detail, the harvester 10 may include frame assembly 12, plant directing system 14, product gathering system 16 and agitating system 18. It will be understood that an exemplary product would be blueberries, however, it will also be understood that the harvester is not limited to use in association with blueberries and the like. Blueberries herein will be utilized for exemplary purposes and should not be deemed limiting the harvester to use solely therewith.

The frame assembly 12 is shown in FIGS. 1 through 8, collectively, as comprising the frame body 12 and the motion assembly (which is not shown). The frame body 12 includes a plurality of support members (in the form of joined beams and/or unitized components, among other types of components) that define a front 23, back 24, top 25, bottom 26, first side 27 and second side 28. The various support components likewise define an elongated and downwardly open central opening, configured to allow for the passage of a plant from the front to the back therethrough. In other words, the frame assembly allows for the passage of a plant within the central opening 29 which is open at bottom 26 and defined, in part, by the first and second sides 27, 28 and the top 25 with the open bottom allowing for the passage of the trunk of the tree without damaging adversely the trunk of the tree. In the configuration shown, the frame body comprises a plurality of beams and the like which are welded or otherwise fastened together through the use of fasteners. The frame body may be formed in any number of different configurations, and the configuration is not limited to that which is herein described. It will be understood that the frame is configured to direct the plant therethrough so that the plant interfaces with the agitating system in the proper manner so that the desired product can be picked (i.e., harvested).

The motion assembly is not shown, but it will be understood that the motion assembly may comprise a plurality of wheels, for example a wheel at each corner that allows for the device to roll with the wheels being spaced to be between rows of plants. In other configurations, a greater number or lesser number of wheels can be utilized. In some embodiments, the motion assembly may comprise a motor and a transmission so that the harvester is self-powered with the force from the motor going through the transmission and being directed to at least one wheel. In other configurations, the harvester may be configured to be pulled or pushed by another implement, such as a truck, a tractor, a piece of construction equipment or the like.

The plant directing system 14 is shown in FIGS. 1 through 8 as comprising inlet portion 30, gathering portion 31 and outlet portion 32. Essentially, the inlet portion 30 generally directs the plant into the harvester in preparation for placement relative to the agitating system. The gathering portion directs the plant into the proper position to interface with the agitating system, and, in turn, the product gathering system. The outlet portion 32 generally directs the plant out of the gathering portion at the end of interaction with the agitating system, and unites portions of the plant for exit from within the harvester. The different portions extend sequentially, while the interface between the portions may tend to overlap. That is, the precise location that the inlet portion meets the gathering portion and the gathering portion meets the outlet portion may be in a general area, and not at a specific point along the travel of the plant within the plant directing system.

The inlet portion 30 typically includes a central separator portion 34, shown in greater detail in FIG. 4, a first side inlet guide 36a and a second side inlet guide 36b. The central separator portion includes a vertical portion 40, a horizontal portion 42 and an arcuate portion 44 that extends from a predominantly horizontal portion to a predominantly vertical portion. In the configuration shown, the horizontal portion is spaced apart from the bottom of the frame (so as to be spaced apart from the ground to be above the base trunk of a plant) and, the arcuate portion is an outwardly concave opening to the front of the harvester. Such a configuration tends to raise the branches of the plant while separating the plant into a first portion and a second portion, with each portion on one side of the central separator portion. In the configuration shown, the arcuate portion 44 is substantially continuously arcuate. In other configurations, the arcuate portion may be formed from a plurality of segments that may be linear or arcuate that are joined in an end to end fashion, with the primary desire being the raising and separating of the plant into a first portion and a second portion.

The first side inlet guide 36a comprises a hoop like member extending inwardly from the first side 27 of the frame body. The hoop like member having some resilience so as to be outwardly flexible and to return to an original configuration. In the configuration shown, the hoop like member includes three separate inwardly directed hoops that are in a spaced apart configuration along the first side 27 proximate the front 23. In other configurations, a sheet of material may be used in place of the plurality of hoop-like members, or another member that includes some level of suspension so as to urge the plant inwardly away from the first side 27 and within the central opening 29. It will be understood that the hoop like members may form a frame for a covering or the like which may form a guide surface or guide wall.

The second side inlet guide 36b comprises any one of the structures disclosed for the first inlet guide 36a. The second inlet guide 36b is positioned on the second side 28 in a configuration which is substantially a mirror image of the configuration of the first side inlet guide 36a. It will be understood that, in a manner analogous to the first side inlet guide 36a, the second side inlet guide 36b urges the plant inwardly away from the second side 28 and within the central opening 29.

Cooperatively between the central separator portion 34, the first side inlet guide 36a and the second side inlet guide 36b, the inlet portion generally divides the plant into two portions on either side of the central separator portion and begins to direct the outer parts of each of the two portions toward the central opening 29.

The gathering portion 31 includes first side gathering portion 50a and a second side gathering portion 50b. It will be understood that the gathering portions are substantial mirror images of each other about the central longitudinal axis of the frame body. As such, the first side gathering portion 50a will be described with the understanding that the second side gathering portion 50b is substantially identical in functionality and may have a structure that is a mirror image of any one of the structures described with respect to gathering portion 50a. Any similar structures will have the same reference number with an "a" referencing the first side gathering portion or a "b" referencing the second side gathering portion.

The gathering portion 31 on either side of the central separator portion is configured to gather each of the first portion and the second portion of the plant, direct the plant into the operating region of the agitating system, maintain the plant in an optimal or preferred location within the agitating system and directing the plant upon exit from the agitating system toward the outlet of the harvester.

With reference to FIGS. 5 through 8, the first side gathering portion 50a includes inner guide frame 52a and outer guide frame 54a, defining a gathering zone therebetween. The inner guide frame 52a includes initial portion 55a, maintaining portion 56a and exit portion 57a. In the initial portion 55a, the plant is essentially rotated outward with the upper portions being urged outwardly and downwardly to a greater extent than the lower portions. In the maintaining portion 56a, the plant is limited thereby from further inward movement toward the agitator axle. As will be explained, it is desirable to maintain the plant within a region of the agitator wherein the respective axial wands have sufficient vibrational amplitude. The exit portion directs the plants outside of the reach of the respective axial wands.

The inner guide frame 52a, in the configuration shown includes a plurality (in this case three) of rod members that extend generally spaced apart from each other and generally longitudinally at least partially between the front to the back of the frame body. At the first end the three spaced apart rod members cooperatively define a plane that is substantially vertical, whereas in the maintaining portion, the spaced apart rod members define a plane that is substantially parallel to the axle 97a of the rotary agitator sub-assembly. At the second end, the spaced apart rod members again return to an almost vertical configuration.

The outer guide frame 54a includes initial portion 60a, a maintaining portion 62a and an exit portion 64a. The initial portion 60a meets the first side inlet guide and then follows the configuration of the rotary agitator sub-assembly so that a portion of at least some of the axial wands extend at or beyond the maintaining portion 62a. In such a configuration, during travel within the maintenance zone a predominant portion of the plant remains within the reach of the axial wands 98, and within a contact portion 110a of the wands. The rear portion of the maintaining portion 62a extends inwardly so as to maintain the plant predominantly in contact with the axial wands 98. The exit portion 64a prepares the plant for release, by widening the zone of maintenance of the plant. In the configuration shown, the outer guide frame 54a extends about the axial wands for a longer extent than if not present, and approaching 180°.

It will be understood that the outer guide frame 54a includes a plurality of rod members (in this case six rod members) that are positioned in a substantially parallel and equally spaced apart orientation, although variations are contemplated. The inner guide frame and the outer guide frame cooperate in a spaced apart manner to maintain the plant within the contact portion of the axial wands and to, in turn, maintain contact therewith.

It will further be understood that variations in each of the inner and the outer guide frames are contemplated. For example, configurations other than elongate rod members are contemplated. In the configuration shown, the rod members are substantially smooth and have a substantially circular cross-sectional configuration, so as to minimize undesirable damage to the plant. In other configurations, different structures, or similar structures with different cross-sectional configurations are contemplated. It is further contemplated that the outer guide frame may be eliminated with the understanding that portions of the plant may extend beyond the reach of the axial wands. In other configurations, portions of the inner and outer guide frames can be eliminated, with the plant being directed over a greater portion of the axial wands 98. However, this may lead to less efficiency due to the motion of a portion of the plant outside of the reach of the axial wands and due to the movement over portions of the axial wands that lack sufficient movement and, consequently agitation. It is further contemplated that either one of the inner guide frame or the outer guide frame may be adjustable depending on the desired angle of the axle of the rotary actuator sub-assembly. It will be understood that certain products and plants may perform better within the harvester at different angles of the rotary agitator sub-assembly.

Further it will be understood that in certain configurations, and as will be described below in greater detail, it may be desirable to have the rotary agitator sub-assembly positioned with substantially vertical axles so that the plant is not separated to a first and second portion, but the entire plant proceeds between the first and second side agitating assemblies. In such a configuration, a large portion of the plant directing system is removed. In particular, the central separator portion 34 of the inlet portion 30 is removed, as is the inner guide frame on either side. It is also contemplated that the outer guide frames may be removed as well, although, in some configurations, the outer guide frame will be outside of the area that will be traversed by the plant, and as such, it may remain in position, without impacting the passage of the plant through the frame, and without interacting therewith.

The product gathering system 16 is shown in FIGS. 1 through 8 as comprising first side gathering portion 70a and second side gathering portion 70b. It will be understood that the first side gathering portion 70a and the second side gathering portion 70b are substantial mirror images of each other. As such the first side gathering portion 70a will be described with the understanding that similar structures having similar functions are found on the second side gathering portion 70b. Additionally similar functional elements will be identified by the same reference numbers augmented with an "a" for the first side gathering portion and augmented with a "b" for the second side gathering portion.

The first side gathering portion 70a includes lower conveyor 71a, inner guide assembly 72a and outer guide wall 73a. The gathering portion is configured to gather any picked product (or product that has otherwise fallen from, in this case the plant) and to direct the product into collection bins (not shown) that are positioned at the outlet of the conveyor. Thus, first the product is received and guided to the conveyor for eventual discharge. Advantageously, due to the orientation of the agitating systems, and their position, the product often has very little distance to drop before reaching one of the gathering portions, thereby limiting both the maximum speed and deceleration to which the product is exposed.

The lower conveyor 71a of the first side gathering portion 70a extends longitudinally along the lower end of the first side 27 between the front 23 and the back 24. The lower conveyor includes first end 74a and second end 76a. The conveyor is arranged to rotate the conveyor toward the back 24 with the gathering surface 77a being substantially horizontal. A discharge structure 78a is positioned at the second end 76a, with a discharge chute 79a extending therefrom and overlying a platform on the frame upon which a basket, box or the like can be positioned. In the configuration shown, the discharge structure 78a is upwardly inclined. The conveyor may include ribs that extend upwardly from the surface of the conveyor. Such ribs extend transversely across the gathering surface 77a so as to keep the product on the conveyor along the incline.

The inner guide assembly 72a comprises a plurality of nested plates that can be rotated or otherwise moved out of the central portion of the central opening so as to permit the trunk of the plant to pass therethrough. The nested plates are biased to return to their original configuration after passage of the trunk or the like. The inner end 81a of the nested plates approach the inner end 81b of the nested plates of the second side gathering portion 70b. The outer ends 82a of the nested plates overlie the gathering surfaced 77a of the lower conveyor 71a. The nested plates are also angled outward and downward so that the outer ends 82a are lower than the inner ends 81a. As such, any product landing on the nested plates will roll, slide or otherwise progress toward the outer ends 82a and drop onto the gathering surface 77a. A foam surface or other padding may be positioned on the nested plates to further minimize damage to the product.

The outer guide wall 73a includes upper end 83a, lower end 84a, first end 85a, second end 86a and wall surface 87a. The outer guide wall is positioned below the rotary agitator assembly. The outer guide wall has an upper end and a lower end, with the upper end being above and outboard of the lower end, so that the outer guide wall is angled relative to a vertical plane bisecting the frame body from front to back thereof. Although not required, and the angles may be varied, preferably, the angle may substantially match the angle of the axle 97 of the first rotary agitator sub-assembly and spaced apart therefrom a distance that is preferably greater than the length of the axial wands so as to be out of reach thereof. The outer guide wall 73a spans preferably across a portion of the first side of the frame body substantially corresponding to the gathering portion 31 of the plant directing system and between the front and the back of the frame body. The lower end 84a extends inwardly so as to overlie a portion of the gathering surface 77a, or is inclined onto another surface that abuts the gathering surface 77a.

In such a manner, the outer guide wall 73a is positioned in an orientation that limits the drop of any product from the plant, and limits the speed/deceleration the product will encounter. It is contemplated that the outer guide wall may be coated with an energy absorbing material, such as a sheet foam, or a spray foam, among other structures. It is contemplated that the guide wall 73a has a trough or the like to direct the product into a generally central location, although variations are contemplated, such as convex or concave structures or other guide structures to guide product into a particular region or area, or along a particular path. In the configuration shown, the outer guide wall is substantially rectangular, although other configurations are contemplated. It is further contemplated that the guide wall may have a varying shape and that the guide wall may extend the length of the conveyor in some configurations. It is also contemplated that the angle with which the guide wall is disposed may be varied, for example, depending on whether the angles of the agitating axles can be varied depending on the particular plant and/or particular product or life cycle position when being picked or otherwise harvested.

The agitating system 18 is shown in FIG. 1 as comprising first side agitating assembly 90a and second side agitating assembly 90b that are positioned in a side by side orientation in a spaced apart manner. The first side agitating assembly 90a is configured to be substantially similar to, in configuration and function, as the second side agitating assembly 90b. As such, first side agitating assembly 90a will be described with the understanding that similar structures having similar functions will be present in the second side agitating assembly 90b. Such similar structures will have the same reference numbers, augmented with an "a" for such structures on the first side agitating assembly and with a "b" for such structures on the second side agitating assembly. In the configuration shown, the first side and the second side are also mirror images of each other that are aligned. In other configurations, the first side agitating assembly 90a and the second side agitating assembly 90b may be in a side by side configuration that is staggered with respect to each other such that the plant encounters one of the agitating assemblies before the other of the agitating assemblies. In such a configuration, it will be understood that the directing system may likewise be staggered so that the directing system on either side is optimally positioned relative to the agitating system. In the offset configuration, typically, the overall length of the harvester increases, which may be problematic at certain locations, plant positions and layouts. In still other configurations, it is contemplated that only a single rotary agitator subassembly may be employed and that it may be mounted in (or movable into) the first operating position, wherein the entirety of the plant passes to one side of the axle 97. In such configurations, the benefits of having less travel of the product are realized with fewer components, albeit, generally larger components (although not required to be larger). In other configurations, the splitting of the plants into components may occur with a single rotary agitator assembly, with the harvester configured to make multiple passes through a row of plants.

The first side agitating assembly 90a includes rotary agitator subassembly 92a, powering subassembly 94a and orienting subassembly 96a. The rotary agitator subassembly, as will be described, is positionable in multiple positions, including, but not limited to a first operating position and a second operating position. In a first operating position, the rotary agitator subassembly is angled with the lower end being centrally located and the second end being positioned outboard thereof, whereas in the second operating position, the rotary agitator subassembly is substantially vertical (or at an angle that is shallower with respect to the vertical than in the second operating position). The operation and the modification or direction of the rotary agitator subassembly from one operating position to another operating position will be described below in detail with respect to the operation.

The rotary agitator subassembly 92a includes axle 97a and axial wands, such as axial wand 98a. The axle is substantially cylindrical, although variations are contemplated and generally forms a right cylinder. Other, generally linear configurations are likewise contemplated. The axle includes a first end 100a, a second end 102a and an outer surface 104a. The second end 102a is generally positioned proximate the bottom 26 of the frame and is repositionable, depending on the operating position in which it is found. The axle 97a is rotatable about its natural axis of rotation, which most often comprises the center of the cross-sectional configuration thereof. As such, the center thereof generally corresponds to the axis of rotation thereof. The outer surface 104a is generally substantially planar and free of surface variations, although not limited thereto. The outer surface 104a includes a plurality of openings or other structures which can capture and retain the axial wands that extend therefrom. In some configurations, the axial wands can be threaded onto the axle, or may be welded to internal structures of the axle. In still other configurations, interference or press fit structures are contemplated, as well as locking and releasing structures. In many configurations, multiple structures for retaining the two components are contemplated.

The axial wands 98a extend generally axially from the outer surface 104a of the axle 97a. The axial wands are configured in a plurality of rows, each row having a plurality of axial wands that are spaced apart from each other in a generally uniformly spaced out configuration. Thus, a plurality of rows of radially outward columns of axial wands are formed. In the configuration shown, a total of 16 rows of axial wands 98a are present uniformly spaced apart between the first end 100a and the second end 102a of the axle. In each row, a total of 18 axial wands extend radially outward spaced apart generally uniformly from each other (in the vertical orientation, with a portion of the axle and a number of rows of wands being removed when in the angled orientation). The position and number of the axial wands is illustrative, and it is contemplated that the axial wands may be positioned in other configurations, one that may form a helical winding, at differing angles relative to each other and/or at different spacing relative to each other. The position of the axial wands may be more arbitrary or may follow a particular pattern that may be different. Further the axial wands may be at an angle relative to the axle, instead of being normal thereto as is shown. The particular configuration and the spacing of the axial wands may be varied depending on the plant and/or product harvested. Indeed, the configuration may be modified by adding, reconfiguring and/or removing axial wands in the field in response to conditions sensed thereat. In summary, the position and number of wands is for illustrative purposes and not to be deemed limiting.

Each axial wand 98a comprises a flexible member typically formed from a plurality of fibers that are encased in a resin matrix and then coated with a polymer or resin to encase the fibers. In the configurations shown, the fibers comprise glass fibers and the axial wands are made through a pultrusion process. Of course other materials and other production methods to make axial wands are contemplated, such as castings, metal or plastic extrusions and the like. Such members generally have some flexibility along the length thereof, while having sufficient strength to remain generally linear at the lengths required. Typically, the configuration of the outer surface 112a of the axial wand is uniformly circular from a cross-sectional standpoint, but variations along the length, as well as other cross-sectional configurations are contemplated. The axial wand 98a includes proximal end 106a that is coupled to the axle and distal end 108a extending therefrom. It is contemplated that within the harvester, a portion of the axial wand is utilized as the contact portion 110a. The contact portion is determined by the configuration of the directing system, wherein portions of the axial wand are generally precluded from interaction with the plant, typically the inward portion proximate the proximal end 106a and generally the outer limits of the axial wand proximal the distal end 108a. Of course, this may be varied in different configurations, and there may be configurations wherein the entirety of the axial wand comprises a desired contact portion.

The powering subassembly 94a is shown as comprising agitation member 114a which includes a motor and linkages that direct the axle in motions that are vertical and/or rotary. Such axle motions cause a horizontal, vertical, and/or a combination of horizontal and vertical oscillations of the axial wands, all of which for purposes of this application is deemed to be agitating. In the configuration shown, it has been observed that the oscillations at the distal end 108a of the axial wands may be upwards of 1 to 3 inches. Of course, there is no limitation as to an upper or lower boundary of the oscillations, however, the agitation member, through the speed of the motor or adjustment to the linkage lengths and the like, can be varied, to achieve differing degrees of vibration, and different deflections of the axial wands along the length thereof. In addition, there may be a back and forth pattern, a more elliptical or square pattern of the second end, depending on the movement directed by the agitating member. For certain plants and products, differing deflections of the axial wands, and or differing speeds associated with the deflections may be desirable. It will be understood that the powering subassembly does not otherwise affect the ability of the rotary agitator subassembly from rotating about the axis of rotation, generally centered about the axle 97a. In other configurations, however, the powering subassembly 94a may additionally actively rotate the axle 97a about the axis or rotation at a predetermined rate. Such a rate may correspond to the rate of movement of the plant through the harvester, or may be a function thereof. In addition, the rate may correspond to the readings of sensors that may be positioned on the frame that monitor performance of the plant within the harvester. In still other configurations, the axle may rotate, but may be dampened or otherwise precluded from free rotation, that is, a certain predetermined force acting upon the axial wands is first necessary prior to initiating rotation of the axle. In such a manner, the wands are precluded from potentially increasing speed due to an unexpectedly large force, whereupon the wands can damage the product because the plant is moving slower through the frame than the axial wands. Thus, some resistance to rotation may be implemented. The powering subassembly is shown as being formed together with the rotary agitator subassembly and to be movable in unison by the orienting subassembly. In other embodiments, the two may be separated such that the powering subassembly remains stationary while the rotary agitator subassembly is moved between the first and second operating positions.

The orienting subassembly 96a is shown as being able to direct the rotary agitator subassembly and the powering subassembly between the first operating position and the second operating position. It will be understood that in some configurations, additional operating positions may be presented that are, perhaps, either beyond the first operating position or between the first operating position and the second operating position (or, on the opposite side of the second operating position from the first operating position).

In the first operating position, the rotary agitator is positioned such that the first end thereof is angled outwardly beyond the second end so that the first end is both above and outboard of the second end, and so that the axle is angled relative to a vertical plane bisecting the frame body from front to back thereof. In the second operating position, the rotary agitator subassembly is positioned to be substantially vertical. In the configuration shown, in the first operating position, the angle of between 20° and 70° relative to the pane, and more preferably between 40° and 60° and most preferably between 50° and 60° is shown. Such a preferred setting is particularly useful for picking of blueberries, and of course the ranges are meant to be exemplary and not to be deemed limiting.

The orienting subassembly 96a includes upper mount assembly 122a, lower mount assembly 124a, and damper assembly 140a. The upper mount assembly 122a is configured to provide positioning in each of the first and second operating positions, while allowing for the movement therebetween. The upper mount assembly 122a includes the upper directing assembly 130. The upper directing assembly includes first side guide channel 132a, second side guide channel 134a, first channel engaging pin member 136a and second channel engaging pin member 138a. The first and second guide channels are generally substantially parallel to each other and spaced apart from each other on either side of the rotary agitator subassembly. The first and second guide channels extend from the top proximate the central portion of the frame outwardly and downwardly toward the bottom. The first and second channel engaging pin members are mounted on the rotary agitator subassembly and are configured to interface with the first and second guide channels so that the rotary agitator subassembly can essentially be translated along the guide channels. It will be understood a stop, lock or other means of precluding movement of the channel engaging pin members along the guide channels once in the desired operating position can be employed. Such a stop may be coupled to the channel engaging pin members, or may be a part of the guide channels themselves.

In the configuration shown, the first lower mount assembly 124a includes a second position mount 126a and a first position mount 128a. The two mounts are spaced apart from each other. It will be understood, and explained below, that when translating the first end of the rotary agitator subassembly from the second operating position to the first operating position, the second end thereof is disconnected or decoupled from the second position mount 126a. Upon placement of the first end of the rotary agitator subassembly into the first operating position (through translating the channel engaging pin members 136a, 138a along the first and second guide channels 132a, 134a), the second end or the rotary agitator subassembly is coupled to the first position mount 128a. The second position mount 126a generally provides a vertical axis, whereas the first position mount is positioned at an oblique angle corresponding to the second operating position. It will be understood that in other configurations, the lower mount may likewise be translated or otherwise moved so that the rotary agitator subassembly is not decoupled therefrom. In still other configurations, where more than two operating positions exist, further lower position mounts may be employed. In the configuration shown, the movement between the first operating position and the second operating position lies within a plane that is generally perpendicular to the travel of the harvester relative to a plant, and the movement of the plant within the harvester, and, as such, the axis of rotation of the axle is within a plane that is generally perpendicular to the travel of the plant within the harvester (although angular displacement is likewise contemplated). It will further be understood that in the second operating position, an extension to the axle may be provided that includes further rows of wands extending outwardly therefrom. Due to the change in angle, a longer axle can be employed when in the second operating position.

The dampening assembly 140a extends from the first end of the rotary agitator subassembly and the frame to provide assistance and support to the rotary agitator subassembly when positioned between the first and second operating positions. In addition, the dampening assembly may provide a support for any electrical or other communication and power cabling and the like. The dampening assembly 140a includes a plurality of linkages 142a and a damper 144a. The linkages provide support to aid in the control of the rotary agitator subassembly with the damper providing a dampening or an assistive force during the relocation and manipulation of the rotary agitator subassembly. In some configurations, a hydraulic cylinders may be coupled to the frame and to the linkages and/or the rotary agitator subassembly to assist with movement between the first and second operating positions.

It will be understood that in other configurations, the orienting subassembly may be accomplished through a pair of upper mounts and a pair of lower mounts wherein the agitator assembly is decoupled from the frame at both the first end and the second end, moved, and recoupled at the other ends. In such a configuration, it may be necessary to employ a frame or other assistive device to control the rotary agitator subassembly. It will further be understood that in other configurations, the rotary agitator subassembly may be permanently configured in only the first operating position, and as such, the orienting subassembly can be removed or can be blocked from operation.

In operation, the harvester of the present disclosure can be configured into operation in either one of the first operating position and the second operating position. As such, the operation will be first described with an initial position of the rotary agitator subassembly in the second operating position, and without installation of the plant directing system. That is, the operation will first describe the installation of the plant directing system and the position of the rotary agitator subassembly into the first orientation. Subsequently, the actual processing of a plant through the harvester will be described. Finally, the conversion of the harvester from the first operating position back to the second operating position will be described.

It will be understood that for embodiments that have only the first operating position, the harvester will typically be set in this first operating position and the directing system will be installed (as there is no configuration wherein removal would be warranted).

In an initial condition, the first and second side agitating assemblies 90a, 90b are in the second operating position (FIG. 9). That is, the first axle is substantially vertical and the second end thereof is captured in the first position frame 126a of the first and second lower mounts. The central separator portion 34 of the inlet portion 30 and the gathering portion 31 of the plant directing system 14 are not installed as they would interfere with the rotary agitator subassemblies 92a in the second operating position. In certain configurations, the outer guide frame 54a of the first and second side gathering portions 50a, 50b may be installed if they do not interfere with the axial wands of the rotary agitator subassemblies. It will further be understood that in the second operating position, an extension may be placed on the end of the axles, as the length of the axles is longer in the first position than in the second position. Of course, this may be varied depending on the particular arrangement thereof. By comparing FIGS. 1 and 9, it can be seen that the length of the axle is increased/decreased between the two configurations so that a greater/or lesser number of rows of wands extends therefrom.

The user can first direct the rotary agitator subassemblies 92a into the proper position. The process will be described with respect to the rotary agitator subassembly 92a, with the understanding that the process is the same with the other rotary agitator subassembly 92b. Specifically, the second end 102a of the axle 97a is decoupled from the second portion frame 126a (FIG. 10) of the first lower mount 124a.

Once decoupled, the rotary agitator subassembly 92a is directed along the upper directing assembly 130a from the second operating position to the first operating position. To achieve the same, the user first unlocks or unstops the channel engaging pin members 136a so that they can slidably move relative to the first and second guide channels 132a respectively. Once unlocked, the rotary agitator subassembly 92a is slid along the guide channels by way of the channel engaging pin members until reaching the first operating position. The dampening assembly 140a provides stability and support during the slidable transition between the first and second operating positions. It is also understood that hydraulic cylinders or the like may aid in the movement between the first and second operating positions.

Once the first end is in the first operating position, in some configurations, the first end is locked so as to prevent the slidable movement of the rotary agitator subassembly along the guide channels. Subsequently, the second end of the rotary agitator subassembly is coupled to the first position frame 128a of the second lower mount 124a. Once attached, the rotary agitator subassembly 92a is in the first operating position and ready for use. A similar procedure is undertaken with the rotary agitator subassembly 92b, and as they are independent, the procedure can be undertaken simultaneously.

Next, the central separator portion 34 can be installed. That is, the vertical portion 40, horizontal portion 42 and the arcuate portion 44 can be installed between the rotary agitator subassembly 92a and rotary agitator subassembly 92b. Once installed, the inner guide frames 52a of the first and second side gathering portions can be installed, followed by the outer guide frames 54a thereof. Once installed, the harvester is ready for use, and is in the configuration of FIG. 1.

In utilization, the operator directs the harvester along the ground (by way of the wheels or the like) so as to position a row of plants directable into the central opening 29 of the frame body 20 at the front 23 thereof. The user proceeds forward at a desired rate of speed (the speed may be constant, varied or intermittent, depending on conditions). As the plant reaches the front of the frame body, any outer branches are directed inwardly toward the central opening by the first and second side inlet guides 36a, 36b of the inlet portion 30. These inlet guides are configured to have some flexibility (and/or to have a soft face formed from a foam material or a flexible material) so as to gently urge the plant toward the central opening without damaging the plant or the product (i.e., fruit or nut, for example) on the plant.

Further inward movement results in the plant encountering the central separator portion. Initially, the horizontal portion, or the beginning of the arcuate portion, splits between branches to divide the plant into a first portion and a second portion. Continued movement essentially directs the plant along the arcuate portion, which continues to divide the plant while directing the branches upwardly. Such a configuration of the arcuate portion limits damage to the plant and to the product, as essentially the plant is being split into two from below and in a direction that is the general direction of the branches (or, with the branches, rather than against the branches).

As the plant reaches the vertical portion 40 (or closer to the end of the arcuate portion, the plant encounters the inner frame guides 52a and the outer frame guides 54a). The inner frame guides direct the plant outwardly and downwardly so as to be generally at the same angle as the axles 97a and so as to be directed to the contact portion 110a of the axial wands 98a of the respective rotary agitator subassemblies.

At the same time, the outer branches reach the outer guide frames 54a, and are generally precluded from further outward or downward movement. As such, the outer portion of each of the two divided portions of the plant, due to the outer frame guide, remain within the contact portion 110a of the respective axial wands 98a.

Also, at the same time, the base or trunk of the plant encounters the inner guide assemblies 72a of the product gathering system 16. In particular, the trunk hits the nested plates 80a and moves them away from each other providing a path or an opening along which the trunk can move. As the trunk moves beyond one of the nested plates, due to the biased nature of the plates into contact with each other, the plates are urged or biased back to their original configuration. Thus, it is intended that only a small area sufficient for the trunk is exposed, with the inner guide assembly maintaining the rest of the nesting plates in the proper configuration minimizing or eliminating any space between the adjoining nested plates and nested plates of either one of the first and second side gathering portions.

As the plant continues, each side of the plant proceeds between the inner and outer guide frames and encounters the respective axial wands 98*a*. The wands have a vibratory movement that may be horizontal, vertical or both, such that the distal ends thereof have a movement of inches (as set forth above). This agitation and vibration dislodges product (i.e., fruit and/or nuts) from the plant. As the plant proceeds, due to the plant movement, the branches impart a rotation to the rotary agitator subassemblies 92*a*. The rotation due to the branches limits damage to the plant, while the vibration dislodges the product therefrom.

Once dislodged, the product falls through the plant (often hitting other portions of axial wands, other branches, leaves, product, guides, etc.) and lands in one of a couple of different surfaces, and is eventually directed onto the gathering surfaces 77*a* of the lower conveyors. In some instances, the product may land directly on the gathering surfaces, or on the nested plates of the inner guide assembly. In the case of the latter, the nested plates are angled toward the gathering surfaces 77*a* of the conveyors 71*a* and roll or slide onto the gathering surfaces. In some configurations, an additional angled plate be positioned so that the product does not land directly on the gathering surfaces of the conveyors but slidably moves on other inclined surfaces (most all of which can be covered with a foam or the like).

However, a predominant portion of the product falls through the outer guide frames 54*a* and falls on the outer guide walls 73*a*. The guide walls are positioned just out of reach of the respective axial wands so as to be positioned very close to the plant as the plant passes through the harvester. The product does not have a large distance to fall due to the relative position of the plant within the harvester and the relative position of the rotary agitator subassemblies. Thus, the speed at which the product is falling and the acceleration that is experienced is for minimal duration, thereby limiting the force with which the product hits the outer guide wall. Additionally, as identified, the outer guide walls may include a foam or other flexible and energy absorbing material to further minimize the potential for damage to the product.

As the product falls onto the outer guide walls, the product rolls, slides or otherwise moves along the outer guide walls to the lower ends 84*a* thereof. As the lower ends meet the gathering surfaces 77*a* of the conveyors, the product transfers to the conveyors. It will be understood that the product continues along on the conveyor where the product is ultimately discharged through the discharge chutes 79*a* at the back of the frame. In the configuration shown, the gathering surface 77*a* has opposing upstanding portions which preclude the product from falling off the gathering surface, and which force the product to continue along the gathering surface. Additionally, due to the deflecting, rather than abrupt stopping, that the product experiences when hitting the outer guide wall and its oblique positioning (and not a flat surface spaced apart a distance from the initial position of the product on the plant), damage to the product is minimized. It has been determined that operation of such a harvester on blueberries can yield blueberries that are free of damage and bruising so as to be packagable as fresh blueberries. As set forth above, whereas common harvesters of the prior art are not suitable for picking ready to package fresh blueberries due to product damage from falling at high velocity over greater distances. Often, such prior art harvesters are limited to use in association with product that is intended to be frozen, not fresh picked.

As can be seen in FIG. 6, for example, the outer guide frame extends inwardly to maintain the plant within reach of the contact portion 110*a*, 110*b* of the axial wands until the plant proceeds beyond the rotary agitator subassembly. Once beyond the agitator subassembly, the plant portions are reunited and brought back together. The, now picked, plant proceeds through the outlet portion 34 of the plant directing system and out of the harvester.

It is contemplated that the process continues from plant to plant along a row of plants. It is further contemplated that the frame may have a height adjustment (which may be achieved through hydraulic cylinders that can raise and/or lower the frame relative to the axles of the wheels) so that plants of differing heights can be processed through the harvester at or close to an optimal position within the harvester.

In certain instances, it may be desirable to process a plant or a row of plants with the rotary agitators in the first operating position. In such an instance, the operator removes the inner guide frames 52*a* and the outer guide frames 54*a*. Next, the user removes the central separator portion 34.

Once these are removed, the user reverses the process of directing the rotary agitator subassemblies from the first operating position into the second operating position. In particular, the second ends of the rotary agitator subassemblies are decoupled from the first position frames 128*a* of the lower mounts 124*a*. Next the respective rotary agitator subassemblies are directed along the respective guide channels back to the first operating position. Once in position, they are locked or otherwise retained at the first end, and coupled to the second position frames 126*a* of the lower mounts 124*a*. Once moved, the operator can process plants therebetween. In this arrangement, the plant proceeds between the rotary agitator subassemblies 92*a* and is agitated by the axial wands of each one. The plant then passes beyond the assemblies. Where such a configuration is utilized for picking, the product generally attains larger velocities due to the relatively longer distance of travel from the plant to the lower conveyors 71*a*. In such a case, the product has a greater chance of damage (skin breaking, bruising, squishing, etc.) due to the larger velocities present, and the larger impact speeds.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A harvester comprising:
a frame having a frame body defining a front, back, top, bottom, a first side and a second side, defining an elongated and downwardly open central opening, configured to allow for the passage of a plant from the front to the back therethrough;
an agitating system mounted to the frame, with at least a portion thereof being within a central channel of the frame, the agitating system having at least a first side agitating assembly further comprising:
a rotary agitator subassembly, the rotary agitator subassembly having an axle with an axis of rotation and a plurality of axial wands extending axially outwardly therefrom in a spaced apart configuration, with the rotary agitator assembly being positioned in at least a first operating position, wherein the axle has a first end and a second end, with the first end being both above and outboard of the second end, so that the axle is angled relative to a vertical plane bisecting the frame body from front to back thereof, with the axle being rotatable about the axis; and a powering subassembly, the powering subassembly including an agitation member which is configured to agitate the axial wands;

a product gathering system including an outer guide wall positioned below the rotary agitator assembly, the outer guide wall having an upper end and a lower end, with the upper end being above and outboard of the lower end, so that the outer guide wall is angled relative to a vertical plane bisecting the frame body from front to back thereof; and a plant directing system comprising a gathering portion, the gathering portion including an inner guide frame outboard of the axle and spaced apart therefrom, with at least a plurality of the axial wands extending therethrough, with the inner guide frame directing a plant away from the axle and through at least a plurality of the axial wands.

2. The harvester of claim 1 wherein the inner guide frame further includes an initial portion, a maintaining portion and an exit portion, the initial portion directing a portion of a plant outwardly and downwardly, the maintaining portion directing the plant through at least a plurality of the axial wands, and an exit portion directing the plant inwardly and upwardly.

3. The harvester of claim 1 wherein the inner guide frame comprises a plurality of spaced apart rod members extending at least partially between the front and back of the frame body, wherein at least a plurality of the axial wands extend between or otherwise around and beyond the rod members.

4. The harvester of claim 3 wherein the rod members of the inner guide frame are spaced apart from each other and spaced apart from the plurality of axial wands.

5. The harvester of claim 1 wherein the gathering portion further comprises:

an outer frame guide outboard of the inner frame guide and spaced apart therefrom so as to direct at least a portion of the plant therebetween, wherein at least a plurality of the axial wands extend at least one of proximate and beyond the outer guide frame.

6. The harvester of claim 5 wherein the outer frame guide further includes a plurality of spaced apart rod members extending at least partially between the front and back of the frame body.

7. The harvester of claim 6 wherein the rod members are spaced apart from each other and spaced apart from the plurality of axial wands.

8. A harvester comprising:

a frame having a frame body defining a front, back, top, bottom, a first side and a second side, defining an elongated and downwardly open central opening, configured to allow for the passage of a plant from the front to the back therethrough;

an agitating system mounted to the frame, with at least a portion thereof being within a central channel of the frame, the agitating system having at least a first side agitating assembly further comprising:

a rotary agitator subassembly, the rotary agitator subassembly having an axle with an axis of rotation and a plurality of axial wands extending axially outwardly therefrom in a spaced apart configuration, with the rotary agitator assembly being positioned in at least a first operating position, wherein the axle has a first end and a second end, with the first end being both above and outboard of the second end, so that the axle is angled relative to a vertical plane bisecting the frame body from front to back thereof, with the axle being rotatable about the axis; and a powering subassembly, the powering subassembly including an agitation member which is configured to agitate the axial wands; and a product gathering system including an outer guide wall positioned below the rotary agitator assembly, the outer guide wall having an upper end and a lower end, with the upper end being above and outboard of the lower end, so that the outer guide wall is angled relative to a vertical plane bisecting the frame body from front to back thereof, wherein the first side agitating assembly is further positionable in a second operating position, wherein in the second operating position, the axle of the rotary agitator assembly is at an angle that is shallower than that of the first operating position, wherein in the second operating position, the axle of the rotary agitator assembly is substantially vertical, wherein the first side agitating assembly further includes an orienting subassembly structurally configured to facilitate orientation of the rotary agitator subassembly between the first operating position and the second operating position, and, wherein the orienting subassembly further includes an upper mount assembly including opposing guide channels with corresponding channel engaging pin members disposed proximate a first end of the rotary agitator subassembly, the opposing guide channels extending between the first operating position and the second operating position, and configured to direct the first end of the rotary agitator subassembly between the first operating position and the second operating position.

9. The harvester of claim 8 wherein the orienting subassembly further includes a lower mount assembly including a first position lower mount frame and a second position lower mount frame, wherein a second end of the rotary agitator subassembly is attachable to the first position lower mount frame when in the first operating position, and attachable to the second position lower mount frame when in the second operating position.

10. A harvester comprising:

a frame having a frame body defining a front, back, top, bottom, a first side and a second side, defining an elongated and downwardly open central opening, configured to allow for the passage of a plant from the front to the back therethrough;

an agitating system mounted to the frame, with at least a portion thereof being within a central channel of the frame, the agitating system having a first side agitating assembly and a second side agitating assembly, positioned in a spaced apart side by side configuration, each of the first side agitating assembly and the second side agitating assembly further comprising:

a rotary agitator subassembly, the rotary agitator subassembly having an axle with an axis of rotation and a plurality of axial wands extending axially outwardly therefrom in a spaced apart configuration, with the rotary agitator assembly being positioned in at least a first operating position, wherein the axle has a first end and a second end, with the first end being both above and outboard of the second end, so that the axle is angled relative to a vertical plane bisecting the frame body from front to back thereof, with the axle being rotatable about the axis; and a powering subassembly, the powering subassembly including an agitation member which is configured to agitate the axial wands;

a product gathering system including a first side outer guide wall and a second side outer guide wall, the first side outer guide wall positioned below the rotary agitator assembly of the first side agitating assembly, the first side outer guide wall having an upper end and a lower end, with the upper end being above and outboard of the lower end, so that the first side outer guide wall is angled relative to a vertical plane bisecting the frame body from front to back thereof, the second side guide wall positioned below the rotary agitator assembly of the second side agitating assembly, the second side outer guide wall having an upper end and a lower end, with the upper end being above and outboard of the lower end, so that the second side outer guide wall is angled relative to a vertical plane bisecting the frame body from front to back thereof; and a plant directing system comprising an inlet portion positioned within the central opening and proximate the front of the frame body, the inlet portion including a central separator portion spaced apart from the bottom of the frame body and configured to separate a plant into a first side and a second side;

wherein the plant directing system further comprises a gathering portion including a first side inner guide frame and a second side inner guide frame, wherein the first side inner guide frame further includes a first end extending from the central separator portion and directed outwardly so as to extend outboard of the axle of the rotary agitator subassembly of the first side agitating assembly while having a portion of at least a plurality of axial wands extending therebeyond; and wherein the second side inner guide frame further includes a first end extending from the central separator portion and directed outwardly so as to extend outboard of the axle of the rotary agitator subassembly of the second side agitating assembly while having a portion of at least a plurality of axial wands extending therebeyond.

11. The harvester of claim 10 wherein the central separator portion extends between the first side agitating assembly and the second side agitating assembly, the central separator portion including an arcuate portion that is outwardly convex so as to direct a plant in an outward and upward direction.

12. The harvester of claim 10 wherein the gathering portion further includes a first side outer guide frame and a second side outer guide frame, wherein the first side outer guide frame is positioned outboard of the first side inner guide frame so as to define a region therebetween, with the axial wands of the first side agitating assembly extending thereinto, and wherein the second side outer guide frame is positioned outboard of the second side inner guide frame so as to define a region therebetween, with the axial wands of the second side agitating assembly extending thereinto.

13. The harvester of claim 10 wherein the harvester is substantially symmetrical about the vertical plane bisecting the frame body from front to back, which vertical plane extends through the central separator portion.

14. The harvester of claim 10 wherein the product gathering system further includes at least one conveyor extending between the front and the back of the frame and positioned so that the lower end of at least one of the first side outer guide wall and the second side outer guide wall directs a product therefrom onto the conveyor.

* * * * *